United States Patent
Bells et al.

(10) Patent No.: US 8,386,769 B2
(45) Date of Patent: Feb. 26, 2013

(54) APPARATUS, AND AN ASSOCIATED METHOD, FOR PROVIDING AND USING OPAQUE PRESENCE INDICATIONS IN A PRESENCE SERVICE

(75) Inventors: Matthew Bells, Waterloo (CA); Gerhard D. Klassen, Waterloo (CA); Brian Edward McColgan, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 263 days.

(21) Appl. No.: 12/621,256

(22) Filed: Nov. 18, 2009

(65) Prior Publication Data

US 2010/0131754 A1 May 27, 2010

Related U.S. Application Data

(60) Provisional application No. 61/116,793, filed on Nov. 21, 2008.

(51) Int. Cl.
*H04L 29/06* (2006.01)
(52) U.S. Cl. .......................... 713/153; 713/168; 709/204
(58) Field of Classification Search .................. 713/168; 709/204
See application file for complete search history.

(56) References Cited

U.S. PATENT DOCUMENTS

| | | | |
|---|---|---|---|
| 5,307,228 A | 4/1994 | Grasty | |
| 6,757,722 B2 | 6/2004 | Lonnfors et al. | |
| 6,928,294 B2 | 8/2005 | Maggenti et al. | |
| 6,965,767 B2 | 11/2005 | Maggenti et al. | |
| 7,043,538 B2 | 5/2006 | Guedalia et al. | |
| 7,187,935 B1 | 3/2007 | Day | |
| 7,206,934 B2 * | 4/2007 | Pabla et al. | 713/168 |
| 7,243,149 B2 | 7/2007 | Kelley et al. | |
| 7,246,371 B2 | 7/2007 | Diacakis et al. | |
| 7,337,465 B2 | 2/2008 | Kiyoto et al. | |
| 7,441,032 B2 | 10/2008 | Costa Requena | |
| 7,472,268 B2 | 12/2008 | Gray | |
| 7,551,925 B2 | 6/2009 | Simongini et al. | |
| 7,567,805 B2 | 7/2009 | Cox et al. | |
| 7,603,467 B2 | 10/2009 | Malik et al. | |
| 7,676,548 B2 | 3/2010 | Oh et al. | |
| 7,684,805 B2 | 3/2010 | Zhao et al. | |
| 7,697,950 B2 | 4/2010 | Jin et al. | |
| 7,702,753 B2 | 4/2010 | Simongini et al. | |
| 7,870,196 B2 | 1/2011 | Costa Requena | |
| 2001/0008404 A1 | 7/2001 | Naito et al. | |

(Continued)

FOREIGN PATENT DOCUMENTS

| | | |
|---|---|---|
| EP | 1396975 A2 | 3/2004 |
| EP | 1396987 A2 | 3/2004 |

(Continued)

OTHER PUBLICATIONS

Examiner's Answer dated May 17, 2011, 7 pages, U.S. Appl. No. 12/252,574, filed Oct. 16, 2008.

(Continued)

*Primary Examiner* — Nathan Flynn
*Assistant Examiner* — Phuoc Tran
(74) *Attorney, Agent, or Firm* — Conley Rose, P.C.; J. Robert Brown, Jr.

(57) ABSTRACT

An apparatus, and an associated method, enables presence information of a presentity to be retrieved by a watcher. Elements, or portions, of the presence information may be made selectively opaque (unreadable) to any but authorized watchers or other consumers of the presentity information.

29 Claims, 3 Drawing Sheets

U.S. PATENT DOCUMENTS

| | | | |
|---|---|---|---|
| 2003/0028621 | A1 | 2/2003 | Furlong et al. |
| 2004/0015569 | A1 | 1/2004 | Lonnfors et al. |
| 2004/0032940 | A1 | 2/2004 | Gray |
| 2004/0123153 | A1 | 6/2004 | Wright et al. |
| 2004/0153506 | A1 | 8/2004 | Ito et al. |
| 2004/0158565 | A1 | 8/2004 | Kakuta et al. |
| 2004/0177134 | A1 | 9/2004 | Lonnfors et al. |
| 2004/0203432 | A1 | 10/2004 | Patil et al. |
| 2005/0068167 | A1 | 3/2005 | Boyer et al. |
| 2005/0135240 | A1 | 6/2005 | Ozugur |
| 2005/0198545 | A1 | 9/2005 | Wieck et al. |
| 2005/0221820 | A1 | 10/2005 | Ruetschi |
| 2005/0228895 | A1 | 10/2005 | Karunamurthy et al. |
| 2005/0232184 | A1 | 10/2005 | Borella |
| 2005/0262198 | A1 | 11/2005 | Leppanen et al. |
| 2005/0266859 | A1 | 12/2005 | Tejani et al. |
| 2006/0085844 | A1 | 4/2006 | Buer et al. |
| 2006/0101266 | A1 | 5/2006 | Klassen et al. |
| 2006/0136717 | A1 | 6/2006 | Buer et al. |
| 2006/0143646 | A1 | 6/2006 | Wu et al. |
| 2006/0165058 | A1 | 7/2006 | Caballero-McCann et al. |
| 2006/0165092 | A1 | 7/2006 | Wilson et al. |
| 2006/0195591 | A1 | 8/2006 | Kim et al. |
| 2006/0234735 | A1 | 10/2006 | Digate et al. |
| 2006/0239186 | A1 | 10/2006 | Wu |
| 2006/0280166 | A1 | 12/2006 | Morris |
| 2006/0286993 | A1 | 12/2006 | Xie et al. |
| 2007/0010275 | A1 | 1/2007 | Kiss |
| 2007/0042791 | A1 | 2/2007 | Walter |
| 2007/0123253 | A1 | 5/2007 | Simongini et al. |
| 2007/0150441 | A1 | 6/2007 | Morris |
| 2007/0150605 | A1 | 6/2007 | Christoffersson et al. |
| 2007/0168424 | A1* | 7/2007 | Oh et al. ............... 709/204 |
| 2007/0168449 | A1 | 7/2007 | Malik et al. |
| 2007/0182541 | A1 | 8/2007 | Harris et al. |
| 2007/0266076 | A1 | 11/2007 | Cox et al. |
| 2007/0288621 | A1 | 12/2007 | Gundu et al. |
| 2007/0291761 | A1 | 12/2007 | Kauniskangas et al. |
| 2008/0010301 | A1 | 1/2008 | Tian et al. |
| 2008/0028211 | A1 | 1/2008 | Tanizawa et al. |
| 2008/0126541 | A1 | 5/2008 | Rosenberg et al. |
| 2008/0133742 | A1 | 6/2008 | Southiere et al. |
| 2008/0153538 | A1 | 6/2008 | O'Shaughnessy et al. |
| 2008/0183866 | A1 | 7/2008 | Maeda et al. |
| 2008/0205625 | A1 | 8/2008 | Mandalia et al. |
| 2008/0208953 | A1 | 8/2008 | Tian |
| 2008/0214170 | A1 | 9/2008 | Laflamme et al. |
| 2008/0285542 | A1 | 11/2008 | Jachner |
| 2008/0288649 | A1 | 11/2008 | Burckart et al. |
| 2008/0313321 | A1 | 12/2008 | Kiss et al. |
| 2009/0106677 | A1 | 4/2009 | Son et al. |
| 2009/0319655 | A1 | 12/2009 | Viamonte Sole |
| 2010/0075673 | A1 | 3/2010 | Colbert et al. |
| 2010/0077038 | A1 | 3/2010 | Boberg et al. |
| 2010/0088388 | A1 | 4/2010 | Donovan |

FOREIGN PATENT DOCUMENTS

| | | |
|---|---|---|
| EP | 1511267 A1 | 3/2005 |
| EP | 1545146 A2 | 6/2005 |
| EP | 1775907 A2 | 4/2007 |
| EP | 1793561 A1 | 6/2007 |
| EP | 1396975 A3 | 1/2009 |
| WO | 2005096592 A1 | 10/2005 |
| WO | 2007007170 A2 | 1/2007 |
| WO | 2008016263 | 2/2008 |

OTHER PUBLICATIONS

Office Action dated Mar. 22, 2011, 34 pages, U.S. Appl. No. 12/252,207, filed Oct. 15, 2008.

Office Action dated Mar. 23, 2011, 30 pages, U.S. Appl. No. 12/252,211, filed Oct. 15, 2008.

Final Office Action dated Apr. 14, 2011, 14 pages, U.S. Appl. No. 12/252,221, filed Oct. 15, 2008.

McColgan, Brian, et al.; U.S. Appl. No. 12/333,710, filed Dec. 12, 2008; Title: Method and System for a Context Aware Mechanism for Use in Presence and Location.

McColgan, Brian, et al.; U.S. Appl. No. 12/333,756, filed Dec. 12, 2008; Title: Method and System for a Context Aware Mechanism in an Integrated or Distributed Configuration.

McColgan, Brian, et al.; U.S. Appl. No. 12/333,784, filed Dec. 12, 2008; Title: Method and System for Specifying, Applying and Extending Application Related Aspects Through Policies, Rules and/or Triggers.

McColgan, Brian et al.; U.S. Appl. No. 12/251,231, filed Oct. 4, 2008; Title: Method for Managing Opaque Presence Indications within a Presence Access Layer.

Rossi, Randy, et al.; U.S. Appl. No. 12/252,574, filed Oct. 16, 2008; Title: System for Assignment of a Service Identifier as a Mechanism for Establishing a Seamless Profile in a Contextually Aware Presence Access Layer.

Rogers, Jeff, et al.; U.S. Appl. No. 12/252,207, filed Oct. 15, 2008; Title: Interworking Function with a Presence Access Layer to Provide Enhanced Presence Aspect Indications.

Lee, Dalsu, et al.; U.S. Appl. No. 12/252,211, filed Oct. 15, 2008; Title: Incorporating Non-Presence Information in the Calculation of Presence Aspects by a Presence Access Layer.

Rogers, Jeff, et al.; U.S. Appl. No. 12/252,221, filed Oct. 15, 2008; Title: Use of Persistent Sessions by a Presence Access Layer.

So, Sin-Hang, et al.; U.S. Appl. No. 12/253,102, filed Oct. 16, 2008; Title: Controlling and/or Limiting Publication Through the Presence Access Layer.

3GPP TS 23.141 V8.0.0; 3rd Generation Partnership Project; Technical Specification Group Services and System Aspects; Presence Service; Architecture and functional description; Release 8; Mar. 2008; 36 pgs.

Brok, Jacco, et al.; Title: Enabling New Services by Exploiting Presence and Context Information in IMS; Bell Labs Technical Journal 10(4); 2006; pp. 83-100.

Chatterjee, Samir, et al.; Title: Instant Messaging and Presence Technologies for College Campuses; IEEE Network; May/Jun. 2005; pp. 4-13.

Cisco Systems, Inc.; Cisco BTS 10200 Softswitch Release 4.1, 4.2, 4.4, 4.5, and 4.5.1 Provisioning Guide; Chapter 8; Nov. 17, 2008; 48 pgs.

Olson, S., et al.; SIMPLE Presence Publication Mechanism (draft-olson-simple-publish-01); Oct. 24, 2002; 27 pgs.

Open Mobile Alliance, Ltd.; PAL Explained; OMA-PAG-2008-0608R01-INP_PAL_V1_0_Overview; Sep. 16, 2008; 16 pgs.

Open Mobile Alliance, Ltd.; Presence SIMPLE Specification; Draft Version 2.0—Jul. 2, 2008; OMA-TS-Presence_SIMPLE-V2_0-20080702-D; 90 pgs.

Open Mobile Alliance, Ltd; Presence Access Layer WID; OMA-TP-2008-0105R03-INP_PAL_WI_for_presentation; Jun. 25, 2008; 22 pgs.

Khartabil, H., et al., "Functional Description of Event Notification Filtering," Network Working Group, RFC 4660, Sep. 2006, 35 pgs.

Rosenberg, J., et al.; Title: Session Initiation Protocol (SIP) Extensions for Presence; Internet Engineering Task Force; Internet Draft: draft-ietf-simple-presence-07.txt; May 20, 2002; 27 pgs.

PCT International Search Report; PCT Application No. PCT/CA2009/000251; Jul. 6, 2009; 5 pgs.

PCT Written Opinion of the International Searching Authority; PCT Application No. PCT/CA2009/000251; Jul. 6, 2009; 6 pgs.

PCT International Search Report; PCT Application No. PCT/US2009/033806; May 14, 2009; 4 pgs.

PCT Written Opinion of the International Searching Authority; PCT Application No. PCT/US2009/033806; May 14, 2009; 6 pgs.

PCT Communication Relating to the Results of the Partial International Search; PCT Application No. PCT/US2009/033808; Dec. 7, 2009; 6 pgs.

PCT International Search Report; PCT Application No. PCT/US2009/033808; Mar. 12, 2010; 7 pgs.

PCT Written Opinion of the International Searching Authority; PCT Application No. PCT/US2009/033808; Mar. 12, 2010; 6 pgs.

PCT International Search Report; PCT Application No. PCT/US2009/033809; Dec. 1, 2009; 4 pgs.

PCT Written Opinion of the International Searching Authority; PCT Application No. PCT/US2009/033809; Dec. 1, 2009; 5 pgs.

PCT International Search Report; PCT Application No. PCT/CA2009/000356; Jul. 16, 2009; 4 pgs.

PCT Written Opinion of the International Searching Authority; PCT Application No. PCT/CA2009/000356; Jul. 16, 2009; 3 pgs.

PCT International Search Report; PCT Application No. PCT/CA2009/000355; Jul. 7, 2009; 3 pgs.

PCT Written Opinion of the International Searching Authority; PCT Application No. PCT/CA2009/000355; Jul. 7, 2009; 4 pgs.

PCT International Search Report; PCT Application No. PCT/CA2009/001647; Feb. 23, 2010; 3 pgs.

PCT Written Opinion of the International Searching Authority; PCT Application No. PCT/CA2009/001647; Feb. 23, 2010; 5 pgs.

PCT Written Opinion of the International Preliminary Examining Authority; PCT Application No. PCT/CA2009/000355; Oct. 18, 2010; 5 pgs.

Office Action dated Jul. 23, 2010, 20 pages, U.S. Appl. No. 12/252,574, filed Oct. 16, 2008.

Office Action dated Nov. 29, 2010, 5 pages, U.S. Appl. No. 12/252,574, filed Oct. 16, 2008.

Office Action dated Dec. 6, 2010, 23 pages, U.S. Appl. No. 12/252,221, filed Oct. 15, 2008.

Roach, A. B.; et al.; "A Session Initiation Protocol (SIP) Event Notification Extension for Resource Lists," Network Working Group; RFC 4662; Aug. 2006; 40 pgs.

PCT International Preliminary Report on Patentability; PCT Application No. PCT/CA2009/000251; Jan. 24, 2011; 15 pgs.

PCT International Preliminary Report on Patentability; PCT Application No. PCT/US2009/033806; Jan. 19, 2011; 11 pgs.

PCT International Preliminary Report on Patentability; PCT Application No. PCT/CA2009/000356; Jan. 20, 2011; 11 pgs.

Office Action dated Feb. 17, 2011, 25 pages, U.S. Appl. No. 12/253,102, filed Oct. 16, 2008.

PCT International Preliminary Report on Patentability; PCT Application No. PCT/CA2009/001647; Feb. 22, 2011; 10 pgs.

Day, M., et al.; "A Model for Presence and Instant Messaging"; RFC 2778; Feb. 2000; 16 pages.

Office Action dated May 7, 2012; U.S. Appl. No. 13/355,269, filed Jan. 20, 2012; 28 pages.

Notice of Allowance dated Sep. 22, 2011, 23 pages, U.S. Appl. No. 12/252,221, filed Oct. 15, 2008.

Final Office Action dated Sep. 9, 2011, 20 pages, U.S. Appl. No. 12/253,102, filed Oct. 16, 2008.

Rogers, Jeff, et al.; U.S. Appl. No. 13/355,269, filed Jan. 20, 2012; Title: Use of Persistent Sessions by a Presence Access Layer.

Office Action dated Feb. 13, 2012; U.S. Appl. No. 12/251,231, filed Oct. 14, 2008; 35 pages.

Office Action dated Aug. 3, 2012; U.S. Appl. No. 12/251,231, filed Oct. 14, 2008; 19 pages.

Notice of Allowance dated Oct. 3, 2012; U.S. Appl. No. 13/355,269, filed Jan. 20, 2012; 20 pages.

* cited by examiner

APPARATUS, AND AN ASSOCIATED METHOD, FOR PROVIDING AND USING OPAQUE PRESENCE INDICATIONS IN A PRESENCE SERVICE

CROSS-REFERENCE TO RELATED APPLICATIONS

The present application claims priority to U.S. provisional patent application No. 61/116,793, filed Nov. 21, 2008, by Matthew Bells, et al, entitled "Apparatus, and an Associated Method, for Providing and Using Opaque Presence Indications in a Presence Service" (33884-US-PRV-4214-20800), which is incorporated by reference herein as if reproduced in its entirety.

BACKGROUND

The present disclosure relates generally to systems having entities thereon who wish to communicate, an example being a telecommunications system where the entities are subscribers. More particularly, the present disclosure relates to an apparatus, and an associated method, by which to create, store, and share presence information about entities in a private and secure manner.

Merging of computer and communication technologies has permitted the development and implementation of new types of communication services that provide for improved communication interconnectivity. Communication services include, not only those that are carried out between communication stations that are connected together by way of wireline connections, but also communication services that are carried out between wireless communication stations, or combinations thereof.

Text messages, such as e-mail messages, have long been used to communicate between two or more parties. Communication using e-mail messages is advantageous for the reason that a receiving party need not be available to receive an e-mail message sent by a sending party at the same time at which the sending party sends the e-mail message. Rather, e-mail communications are of a store-and-forward-type. When the receiving party is ready to receive the message, the message is forwarded, from a store-and-forward entity, to the receiving party. While rudimentary systems provided merely for the communication of messages in textual form, newer schemes often permit for the communication of large data files that provide audio, video, and multimedia services to be performed.

And, more recently, push message services have also been developed. Push message services are also regularly utilized to communicate between two or more parties. In a push message service, a message sent by a sending party is "pushed" to the receiving party. That is to say, the message generated by the sending party is immediately and actively transferred so that the message is received at the receiving party with little or no delay. Push message services between two or more parties have achieved significant levels of popularity, and the messaging services are regularly utilized for on-line "chats", social networking, and other communication activities. Push-messaging services, generally, provide an always-on capability, thereby to provide for the nearly-immediate, ad-hoc message communication.

Push message services are also available by way of wireless communication stations, such as portable mobile stations. Instant messaging services are carried out with a mobile station in manners analogous to manners by which the push message services are carried out by wireline-connected communication stations.

Such message services generally utilize a presence server to ascertain whether an individual or entity is available to communicate using the associated service.

DETAILED DESCRIPTION

A party or entity that provides presence information, directly or indirectly, to a presence server may be referred to as a presentity. A party with whom the presence information is shared through the presence server may be referred to as a watcher. As used herein, presentity and watcher have these intended meanings.

Presentities may have privacy, security and integrity concerns. Privacy and security concerns are characterized by the need to control who sees the information (or a subset thereof) about a presentity, and where that information is residing on, or accessible by, a presence server. Integrity concerns are characterized by the need to make sure the information available about a presentity that is residing on, or available to, a presence server is reliably gathered, stored, or propagated. Privacy, security and integrity concerns are interwoven, and therefore may be addressed using common solutions.

A privacy/security concern exists when a presentity would like to share the presence information related to itself with a watcher or a group of watchers, but not to all watchers. There may also be situations where the presentity may need to keep information from being seen by the presence server, or, a combination of watchers and the presence server. A further situation arises when a presence server also acts as a watcher, and consumes presentity information in a way not authorized or unbeknownst to the presentity.

A related situation arises when the presentity cannot be sure the presence server promulgates information as directed by the presentity to authorized watchers. If the presence server is trusted, it can be assumed to function as requested. However, in many situations a presence server cannot be trusted, so a presentity will be unable to assume its requests about propagating presentity information from the server will be carried out exactly as requested.

An integrity situation exists when a presentity needs assurance that information about itself on a presence server is not changed or altered in an unauthorized way.

Disclosed herein is an apparatus and method to enable a presentity to control its presence information, including its ability to control to whom the presence information is permitted to be published, when the presence server or other platform providing services with the presence server is not fully trusted. This enables a presentity to control the security and integrity of its data.

Through operation of an embodiment of the present disclosure, a manner is provided by which to create, store, and share presence information in an opaque manner that limits availability of presence information to only those whom the presentity permits access.

In one aspect of the present disclosure, presence information stored or kept by a presence server or other presence platform performing similar functions or providing ancillary support to the presence server, is kept in a form that such that a presence server can detect data is present but that data is not directly readable. An example would be an encrypted file associated with a presentity. The presence server can tell a presentity file is there, but cannot read it. This may also be true of fields of information in a file. Thus, an untrusted or partially trusted presence server is unable to ascertain the content of the presence information. This information is considered to be opaque to the presence server. The presentity is provided, thereby, with greater assurance that the presence information of the presentity shall be available only in the manner desired by the presentity. Only when the presence information is made non-opaque, i.e., converted into clear form, can the information be ascertained.

In another aspect of the present disclosure, the presence information is placed into opaque form by performing a hash algorithm/function upon the presence information. The resultant, hashed value is opaque to all parties but for parties that are capable of performing the same hashing, or its reverse.

In another aspect of the present disclosure, the presence information is encrypted. All variations of encryption are fully contemplated herein, including any method of distributing keys or providing access to keys, or to whom the keys may be provided.

One embodiment may use one or more symmetric encryption keys. The presence information, once encrypted, is opaque to all parties except those having access to a symmetric encryption key. A party provided with a particular encryption key is permitted access to particular presence information encrypted with the same key by the presentity. Note that a presentity may make use of a plurality of keys, each key used to encrypt different information, and then provide the collection of information to a presence server. This allows the presentity to have fine granularity of control over who can see what information, based on who has, can retrieve, or is otherwise provided with the associated symmetric keys. The encrypted data may also be combined with, or provided at the same time as, clear data. In some cases, a presentity can use symmetric keys such that only the presentity and one or more selected watchers can see the data; to the presence server and other servers or supporting machines or nodes the information remains opaque. Alternatively, the data may be available to the presence server and one or more watchers, or, only to the presence server. All combinations and variations on who has access to the otherwise opaque information are fully contemplated herein.

There is no dependency on data organizational units and opaqueness. For example, a single file may contain a plurality of presentity information, some clear, some encrypted with one key, some encrypted with another key, and so on. Alternatively, the data in a single file may all be encrypted with a single key. All such combinations are intended to be within the scope of the present methods and apparatuses.

The presence information may also be encrypted using one or more asymmetric encryption keys. Once encrypted by the public key, the presence information is not ascertainable by any party but for a party that has access to the private key. A party provided with a particular encryption key is permitted access to particular presence information, which is not necessarily the same information that is permitted to be viewed by another party that is provided with a different encryption key.

The disclosed embodiments are not mutually exclusive, and may be mixed in any particular embodiment. For example, one presentity may make use of symmetric and asymmetric encryption algorithms, one-way hashes, and any other method to make data opaque. This may be juxtaposed with clear data. Any combination may be used on any particular embodiment. Information consumers, including watchers and presence servers, may see the data that is not opaque to them. Each may have a unique set of data which is not opaque to them, or, groups of information consumers may have the same or similar sets of data they can see while other individuals or groups of information consumers may have another set of data which is not opaque to them.

In another aspect of the present disclosure, placing of the presence information into the opaque form is performed by the presentity, that is to say, the presence source. As discussed above, the operations performed to place the presence information into opaque form need not be performed on all of the presence information, only the presence information that the presentity desires to make opaque. Selection is made by the presentity as to which of the presence information or indications that is to be hashed or encrypted. The resultant presence information includes both opaque portions and non-opaque, i.e., clear, portions. The presence information, including at least portions that are placed into opaque form, is provided by the presentity to a presence user agent.

In another aspect of the present disclosure, the opaqueness of the presence information to watchers or other information consumers is dependent upon a time indicia. For example, a time-of-day indication is provided, and the opacity of the presence information, or subsets of it, is dependent upon the time-of-day. Other time indicia are analogously used. Typically this determination is made by a presence server, so is most trustworthy when a server is trusted or partially trusted; it may be used with an untrusted server, however, in some embodiments. Other embodiments include the presentity controlling opaqueness by not sending the opaque data except during the designated time periods (based on local device time and/or a connection to a reliable time source—such as a stratum-0 time server), and includes embodiments where the presentity may send blank (filler) or useless information for a specified field or as a placeholder, thereby making the real information opaque during the disallowed time periods.

In another aspect of the present disclosure, the opaqueness of the presence information is location-dependent, depending upon a location indicia. For example, the location of the presentity is determinative of whether the presence information is published in opaque form. Depending upon the location of the presentity, the presence information is permitted to be accessed by certain watchers, and not by others, wholly unavailable, or wholly available.

In another aspect of the present disclosure, the presence information is maintained at a presence server, or other presence platform. The presence information, including at least portions that are opaque, is selectively available for watchers. Hash algorithm information, e.g., a hash seed, or encryption/decryption keys, as appropriate, are also stored together with the presence information at or by the presence platform.

The present disclosure also anticipates the scenario where the presence server or platform does not have any access (or holds) keys. For example, in the symmetric case (private keys), the presentity might directly share those keys with the watcher (meaning the keys are not accessible to the presence service) and completely circumvent the third-party PS/platform. Only encrypted information is stored and sent onward to the watcher by the PS/platform. The watcher uses the 'a priori' private key (agreed on between the watcher and presentity) to decode the opaque presence information.

In another aspect of the present disclosure, a watcher makes a subscription request to access the presence information of a presentity to the presence platform. A policy document is thus applied by the presence platform for the watcher, in order to authorize the request. The presence information, including the opaque portion, is provided to the watcher, if authorized. Alternately, if the presence server is capable of restricting or narrowing the opaque data, the data that is transmitted to the watcher that makes the request is first restricted or narrowed so that only the authorized data is sent.

Because the presentity is provided with a capability of placing part, or all, of the presence information in opaque form, only those watchers that the presentity desires to have access to the presence information are provided with the information in a clear readable format.

Figure 1:
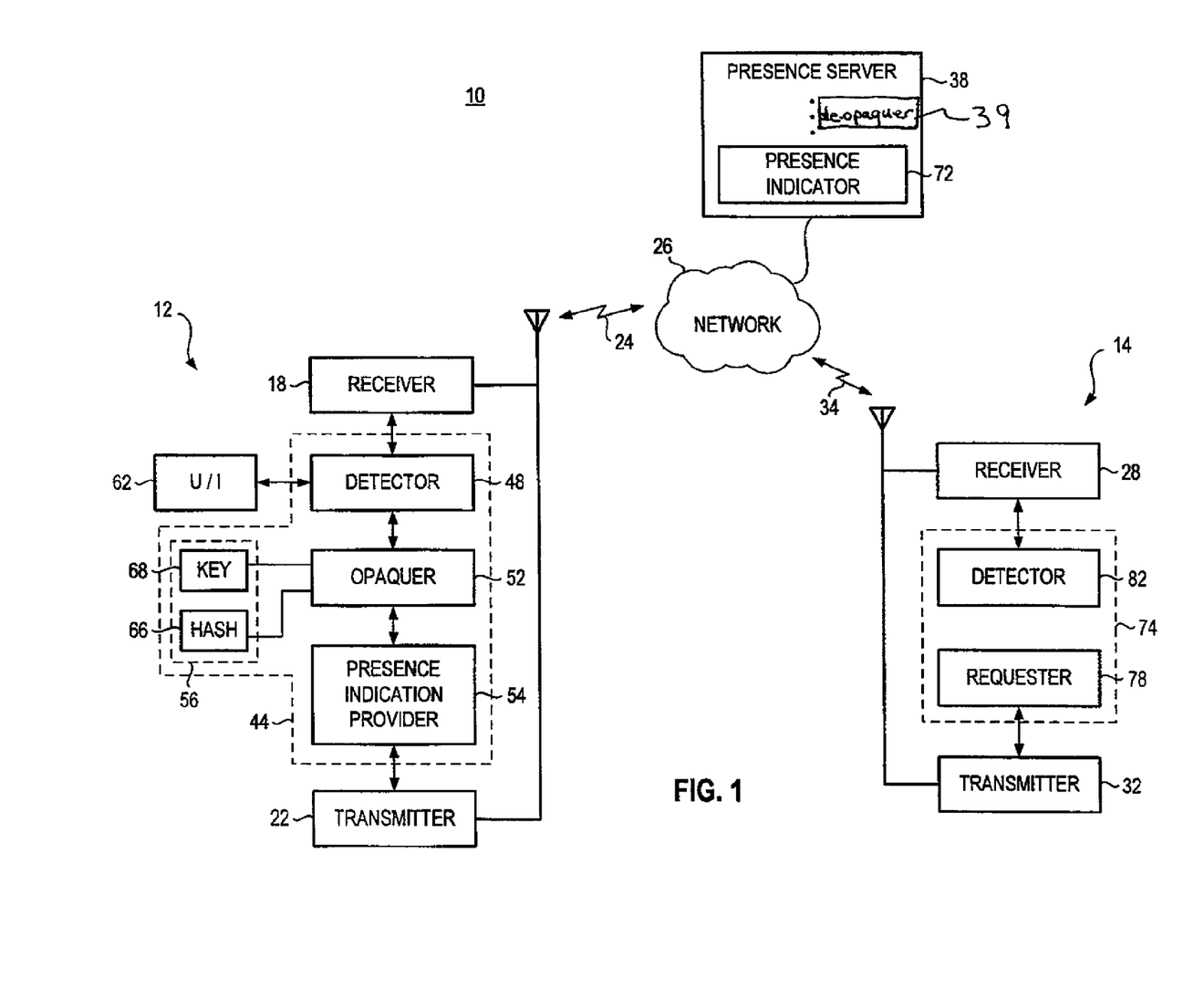
FIG. 1 illustrates a functional block diagram of an arrangement that includes an embodiment of the present disclosure.

Referring to FIG. 1, a communication system, shown generally at 10, provides for communications between communication stations, here mobile communication stations 12 and 14. For purposes of explanation, the communication station 12 forms a presentity, that is to say, is operated by a presentity, in a presence service, such as in instant messaging service. Also, the communication station 14 forms a watcher pursuant to the presence service. The station 14 is also representative of other entities. For example, the station 14 is also representative of an instant messaging service that is attempting to initiate an IM (instant message) chat with a person of interest, e.g., the presentity. In an actual implementation, each of the communication stations is capable of being either a presentity or a watcher on behalf of a presence capable or presence aware service (e.g., IM, PoC, etc.). While the stations 12 and 14 are represented as wireless devices, in other implementations, one or both of the communication stations form wireline devices. Also, while the following description of exemplary operation shall describe operation with respect to an instant messaging service, in other implementations, other types of services are performed that make use of presence information.

More generally, the presentity comprises any person or other entity, e.g., an entity at which content originates. Such content includes audio, video, data, or any time of information that is able to be communicated in a communication system of which the system 10, shown in FIG. 1, is exemplary. And, more generally, any device usable by a presentity, comprising, e.g., a presence source, such as a Graphical User Interface (GUI), a mobile station, a network element, a server, tracked goods or vehicle, or a computer-based application. Due to the relationship between a presentity and a presence source, such terminology is sometimes, including herein, used interchangeably. Analogously, a watcher comprises any device, such as a network element, server, computer application, or GUI potentially capable of consuming presence information.

Here, the communication station 12 of the presentity includes receiver circuitry having a receive part 18 and a transmit part 22 that communicates by way of a radio air interface 24 with a network 26. The network 26 is representative of both a radio access network (RAN) and a core network (CN) or, more generally, any network capable of providing communication connectivity. The communication station 14 that forms the watcher also includes transceiver circuitry here represented as a receive part 28 and a transmit part 32 that also is capable of communicating by way of a radio air interface, here represented at 34, with the network 26.

The communication system also includes a presence platform, here a presence server 38 that is placed in communication connectivity with the network 26. The presence server, e.g., comprises a Yahoo™ or MSN™ presence server. Or, e.g., the presence server is bundled into a larger service. An exemplary service into which the presence server is bundled comprises Google Talk™. The presence server is representative of a presence server that is of marginal trustworthiness.

As mentioned previously, use of a presence platform that is not considered to be wholly trustworthy might place the presentity's presence information at risk of being accessible in manners other than manners desired by the presentity. Accordingly, the presentity device 12 includes an apparatus 44 of an embodiment of the present disclosure that operates to place presence information of the presentity into a form that prevents its reading except for those watchers that the presentity authorizes. The apparatus 44 is functionally represented, implementable in any desired manner, including, e.g., algorithms executable by processing circuitry, hardware implementations, and combinations thereof. The apparatus here includes a detector 48, an opaquer 52, and a presence indication provider 54. The element 54 forms a presence source as this element transmits or publishes presence information. This element is sometimes also referred to as a presence user agent. A memory element 56 also forms part of the apparatus, and the storage elements of the memory device are accessible by other elements of the apparatus.

The communication station 12 further includes a user interface 62 that includes a user input actuator and a user display device permitting a user, i.e., a principal, to enter input information and to view output information. Here, the user utilizes the input actuator of the user interface to enter presence information or indications. Entered presence indications are detected by the detector 48. Presence information need not be manually entered. Some information is inferred by the communication station 12, or analogous device. For instance, if the communication station is holstered, that is, placed in a holster device may cause the detector 48 to infer that the user is 'inactive'. Further, location information, such as that provided by GPS operation could be used to derive a presentity status on behalf of detector 48, without user interaction. Alternately, once initially provided, the presence indications are stored at storage locations of the memory element 56, and the detection made by the detector is of stored values of the presence information. The detected presence information, together with constraints, e.g., time or location constraints, associated therewith and detected by the detector 48 are provided to an opaquer 52. The opaquer 52 operates to make at least selected portions of the presence information opaque, i.e., not directly readable by any other party unless authorized by the presentity. In one implementation, the opaquer 52 retrieves a hash algorithm 66 stored at the memory element 56. In this implementation, the opaquer operates to hash the presence information, or at least the portions thereof that are to be placed into opaque form.

In an alternate implementation, an encryption key 68 is retrieved from the memory element 56. Here, the opaquer 52 encrypts the presence information, or at least selected portions thereof, using the retrieved encryption key. In one implementation, the encryption key 68 forms a symmetric key. In another implementation, the encryption key 68 forms an asymmetric key. As can be appreciated, various types of encryption may be employed.

Exemplary hash algorithms that are used by the opaquer include the MD5, SHA-1, and SHA-2 hashing algorithms. Exemplary symmetric keys usable to make the presence information include AES and 3DES symmetric keys. And, exemplary asymmetric keys usable to place the presence information into the opaque form include the DSS, ECC, and RSA asymmetric keys.

Once the presence information, or selected portion thereof, is placed in the opaque form, the presence information is provided to the presence indication provider 54. The presence indication provider 54 places the presence information into a form to permit its transmission by the transmitter 22 for communication from the presentity device to the network 26 and, in turn, to the presence server 38, usable to form a presentity presence document thereat.

The presence information is maintained as a presentity presence document 72 at the presence server. That is to say, the presence information is subsequently published or stored at the presence server as part of the presence information store or database of the presentity. The presentity also publishes, or otherwise provides, direct or indirect indications of the presence policy of the presentity towards watchers, i.e., presence information subscribers. In one implementation, the presence information stored at the presence server also includes key information, or hash algorithm information needed by a watcher to place opaque, presence information into clear, i.e., non-opaque form. For instance, when an asymmetric key is utilized to encrypt the presence information to place it into opaque form, the value of one or more asymmetric keys is published as part of a policy document of the presentity. The keys are stored using, e.g., base 64 text, or indirect storage using a URI (uniform resource identifier), or by using indirect content storage such as through use of an OMA (Open Mobile Alliance) content XDMS (XML document management server).

When a subscription request is made, here by the watcher 14, an associated policy matching is invoked by the presence server. A matching policy document is applied to authorize on behalf of watcher 14 and, once authorized, transform presence information of the presentity of interest, here the presentity 12. In one exemplary implementation, the presence information, including the opaque information, is sent in its entirety to the watcher 14. In another implementation, the presence server provides, or supports, the demarcation of one or more opacity presence information elements. In this implementation, the presence server is itself able to restrict, or narrow, the opaque data transmitted to the watcher. Control of this is carried out, in whole or in part, by the presentity via the presence server through use of policy. That is to say, in this implementation, the presence server 38 is capable of ascertaining which portions of the presence information 72 are in opaque form and to not provide the opaque information to the watcher in response to a subscription request.

When the presence information stored at the server includes an encryption/decryption key or hash-algorithm information, the key or hash-algorithm information is included as part of a presence notification provided by the presence server or information provided as part of a successful acknowledgement of a subscription request. For example, the subscription acknowledgement in a SIP/SIMPLE implementation comprises a SIP/200-OK response that includes, in its body, the hash or key (or keys) distributed to the watcher by the presence server on behalf of the presentity. When included as part of a presence notification, the presentity, and/or the presence server, is able to vary the keys that are distributed. In an enterprise scenario in which keys sometimes have limited lifetimes, after which the keys are no longer usable by a watcher to resolve opaque, presence information into clear form, providing the keys together with the presence information better ensures that the presence information is placed into clear form in a timely manner. In an alternate implementation, the presence server plays no role in key exchange between a presentity and a particular watcher. In this alternate implementation, e.g., in a symmetric case using private keys, the presentity shares the keys with the watcher in an outside channel from the presence server, thereby eliminating the possibility of decryption of presence information by the presence server or platform. The keys are therefore not accessible to the presence server. Only encrypted information is stored and sent on to the watcher by the presence server or platform. The watcher uses an apriori private key, i.e., a key agreed upon and exchanged between the watcher and the presentity prior to publication by the presentity, in order for the watcher to decode the opaque presence information.

In one implementation, responsive to a presence notification provided by the presence server to the watcher, a watcher agent of the watcher processes the notification and applies the appropriate key, or seed, to decrypt presence information elements that the presentity has permitted the watcher to view.

Here, the communication station 14 that forms the watcher also includes an apparatus, here shown at 74, of an embodiment of the present disclosure. The apparatus is functionally represented, formed of functional entities implementable in any desired manner including, e.g., by algorithms executable by processing circuitry, hardware implementations, and combinations thereof.

The apparatus 74 is here shown to include a requestor 78, and a detector 82. The requestor 78 operates to generate the subscription request that is caused to be sent by the transmit part 32 by way of the radio air interface 34 and the network 26 for delivery to the presence server 38. If the subscription request is granted, as described above, the presence server may provide as part of the subscription request acknowledgement, a decryption key (keys) to the watcher. Subsequently, presence notification(s) is/are sent by the presence server to the watcher that includes opaque, presence information. In an alternative embodiment, rather than transmitting the key (keys) as part of the subscription request acknowledgement, the key (keys) may be sent as part of the initial notification, or may be sent in one or more subsequent notifications toward the watcher or otherwise made available to the watcher. In another alternative embodiment, the keys may be shared apriori between presentity and watcher, using an external mechanism (e.g. direct person-to-person communication).

Decrypting encrypted information, or making opaque information clear by mechanisms or operations other then decrypting, may be carried out by any combination of software or software and hardware configured to carry out the applicable logic steps. This may be called a de-opaquer, a clear-information generator, or, a decrypter for the specific case of decrypting encrypted information. A de-opaquer 39 is shown in the presence server 38 in FIG. 1, but in other embodiments the de-opaquer 39 could be located elsewhere.

The detector 82 operates to detect the presence notification and to operate upon the presence information provided therewith. The detector further includes the functionality of a decrypter, or the like, that converts the opaque presence information into clear form and provides for its display at a user display or its use by a presence capable or presence aware service. In this way, the presence information of the presentity or a resulting presence state can be displayed to a viewer or provided as part of a function point of a presence capable or presence aware service. A function point can generally be considered to be one or more service functionalities. That is, a service presumably has a function set, and some of them (or possibly all of them) may depend on presence status. For example, in an IM service, a function point could be 'initiate an IM chat session with buddy X'. As part of this function point, it may be specified that Buddy X be willing and reachable. Those are two 'presence aspects' which qualify this IM service as a presence capable or presence aware service in order to achieve the 'initiate an IM chat session with buddy X' function point. The detector also, e.g., processes pres-info (presence information) to derive or infer a state either wholly or in combination with other meta-data available to the device.

In one implementation, the application of encryption and decryption of the presence information to place it in opaque, or clear, form is time-dependent. The time dependency originates, e.g., at the presentity or at the presence server. For example, the time factor comprises a time-of-day indication. And, the time-of-day indication forms a criterion that is used to establish whether the presence information, or portions thereof, is to be placed into opaque form.

By way of an example, the presentity identifies a time of day, e.g., 7:00 p.m., at which the presentity switches out of a work mode and into a personal mode. This switch has a corresponding impact on the presence indications of the presentity. The presence server, for instance, incorporates time as a criterion in matching time criteria into an appropriate policy decision. In this example, after 7:00 p.m., no one from the work sphere of the presentity is able to see the presence information of the presentity. And, therefore, all information related to the presentity is opaque, encrypted using an encryption key or hashed using a seed, and not resolvable to work associates. The information is, e.g., encrypted by the presentity, and the presence server elects not to perform decryption for a particular watcher. The watcher would not be able to resolve the information. In an alternate embodiment, the presence server performs encryption on behalf of a presentity, thereby to make the information opaque.

In another implementation, a location criterion is utilized. By way of an example, if the presentity moves between a work location or area to a home location or area, the change in location impacts the manner by which the presence information is published and whether a watcher is able to resolve, i.e., place into clear form, the presence information, or portions thereof. In this implementation, the presence server includes a detector that detects location changes of the presentity or otherwise is provided with location information related to the presentity. The detector, in one implementation, comprises a rules server or a rules/criteria component located in a network for establishing or assisting in location changes. If the location-based rules of the presentity prohibit work associates from seeing presence information of the presentity when the presentity is positioned at a location away from work, such as at the home location.

Figure 2:
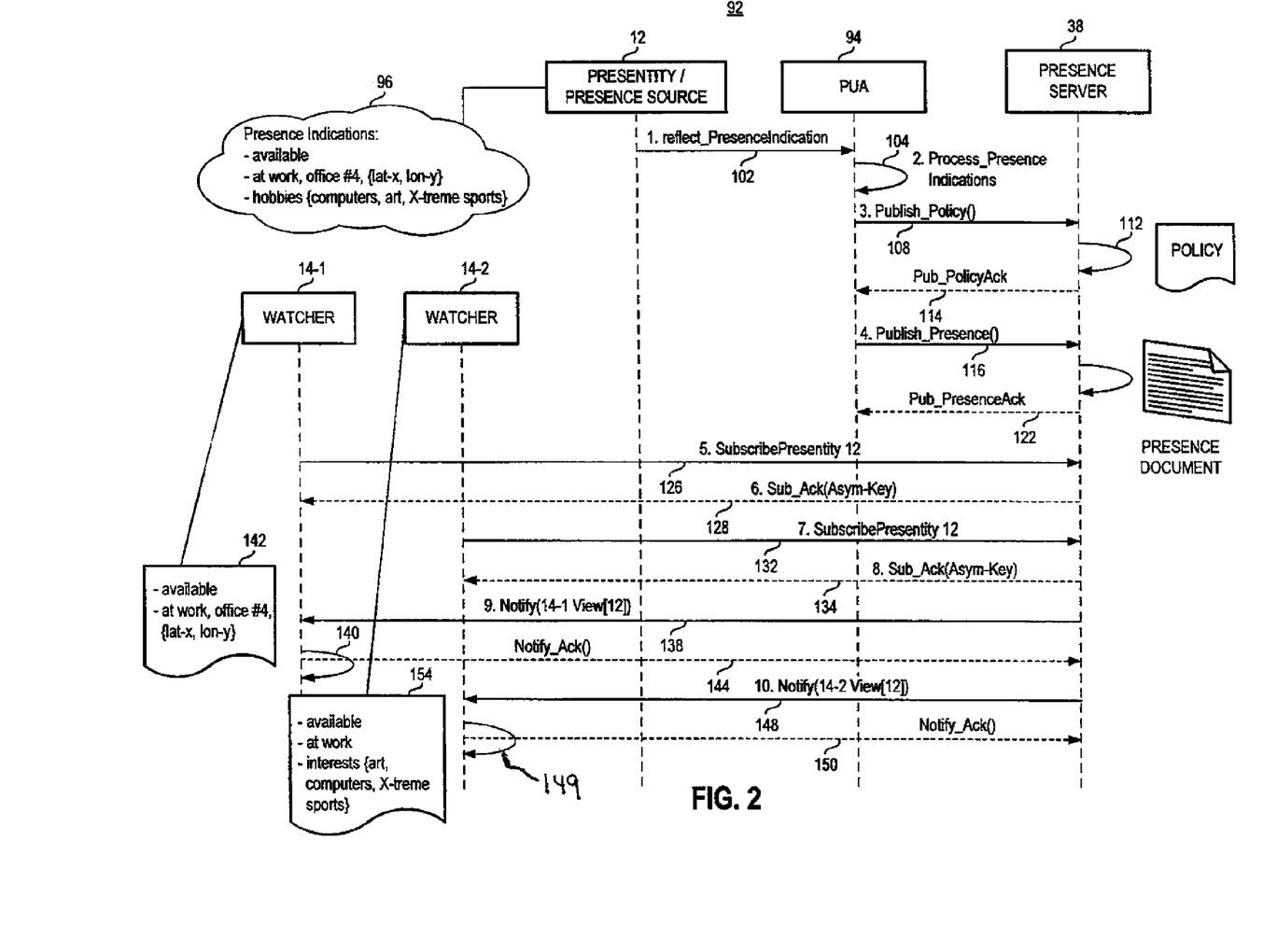
FIG. 2 illustrates a message sequence diagram representative of exemplary signaling generated during operation of an embodiment of the present disclosure.

FIG. 2 illustrates a message sequence diagram, shown generally at 92, representative of exemplary operation of an embodiment of the present disclosure. The presentity 12 and two watchers, a watcher 14-1 and a watcher 14-2, are included in the exemplary signaling. A presence user agent 94 is also utilized. The presence user agent (PUA) 94 might be substantially equivalent to the communication station 12, including the transmitter 22 and apparatus 44 portions, or might be some other presence source. Alternatively, the PUA 94 might be positioned elsewhere, in communication connectivity with the presence server, such as when the presence user agent is embodied at a different network node. Here, the presentity is provided with, and detects, presentity indications, of which the presence indications shown in the cloud 96 are examples. First, and as indicated by the segment 102, the presentity might provide the presence indications of the presentity to the presence user agent. Alternatively, the presence indications of the presentity may also be 'detected' by the state of the communication station 12 as described for FIG. 1. The presence user agent processes, indicated by the segment 104, the provided, presence indications, and the presence user agent generates a representation for the corresponding presence server 38. Subsequent to processing, here, portions of the presence information remain in clear form, and other portions are placed into opaque, here encryption-key, encrypted form. For instance, the availability of the presentity and the proximity location remains in clear form while the physical location and hobbies and other interest information of the presentity are encrypted.

Then, and as indicated by the segment 108, publication documents are published behalf of the presentity 12. In this example, the publication documents include authorization to the watchers 14-1 and 14-2 and include appropriate key information for the authorized watchers. The presence server 38 processes, indicated by segment 112, the policy document of the presentity. The presence server here generates an acknowledgment message to the PUA, indicated by the segment 114. Publishing of the presence document is indicated by the segment 116 along with an acknowledgment thereto, indicated by the segment 122.

Subsequently, the watcher 14-1 subscribes, indicated by the segment 126, for the presence information of the presentity 12. Here, because the watcher 14-1 is authorized (as defined by policy document processed in step 112), the presence server authorizes the watcher 14-1 and sends a subscribe success acknowledgment, indicated by the segment 128, together with a key, here an asymmetrical key, that is, a public key that is used by the presentity 12 to encrypt the presence information relative to the watcher 14-1.

And, in this example, the watcher 14-2 also subscribes, indicated by the segment 132, for the presence information of the presentity 12. And, the presence server 38 responds with a subscribe acknowledgment and authorization, indicated by the segment 134. The acknowledgment here also includes a public key to permit watcher 14-2 to decrypt the presence information relevant to the watcher 14-2. Specifically, the watchers 14-1 and 14-2 employ private keys respectively issued by the presentity apriori, or via some other trusted key distribution mechanism, in order to decrypt the corresponding opaque pres-info. The asymmetric-keys transmitted by the presence server on behalf of the presentity toward the watchers, in one implementation, may serve as an identifier or indicator to the watcher-agents, regarding which private key to make use of or apply to the decryption process.

Subsequently, the presence server sends, indicated by the segment 138, a notification to the watcher 14-1 with an authorized view of the presentity's presence information. The presence information may, or may not, include all or part of what the watcher 14-1 is permitted to see of the presence information. When watcher 14-1 processes the data and decrypts the encrypted information that the watcher 14-1 is authorized to view, an exemplary document is presented to the watcher 14-1, here the document 142. The watcher 142 also sends a notify acknowledgment, indicated by the segment 144, to the presence server.

Analogously, the presence server also sends, indicated by the segment 148, a notification to the watcher 14-2 with the watcher's authorized view of the presentity's presence information. The watcher 14-2 processes the data, indicated by the segment 149, and provides an acknowledgment, indicated by the segment 150, to the presence server, and displays a document of which, here, the document 154, is exemplary.

In this example, the watcher 14-1 is able determine exactly where the presentity is, as the watcher 14-1 is a work colleague of the presentity. But, the watcher 14-1 is unable to see all the information of the presentity. In contrast, the watcher 14-2 is able only to determine that the presentity is at work. But, the watcher 14-2 is provided with a full view of the personal hobbies of the presentity, as the watcher 14-2 is, here, a personal friend of the presentity.

In another implementation, the presentity selectively shares the key or hash with the presence server such that the presence server has the ability to decrypt specific presence information elements. This implementation is particularly useful in scenarios in which all presence information is encrypted or otherwise opaque. For example, in a scenario in which presence information is sent, "in the clear" using insecure, IP-based communication links but in which the presentity desires to ensure that the presence information elements are not detectable to a device that monitors the insecure link.

Figure 3:
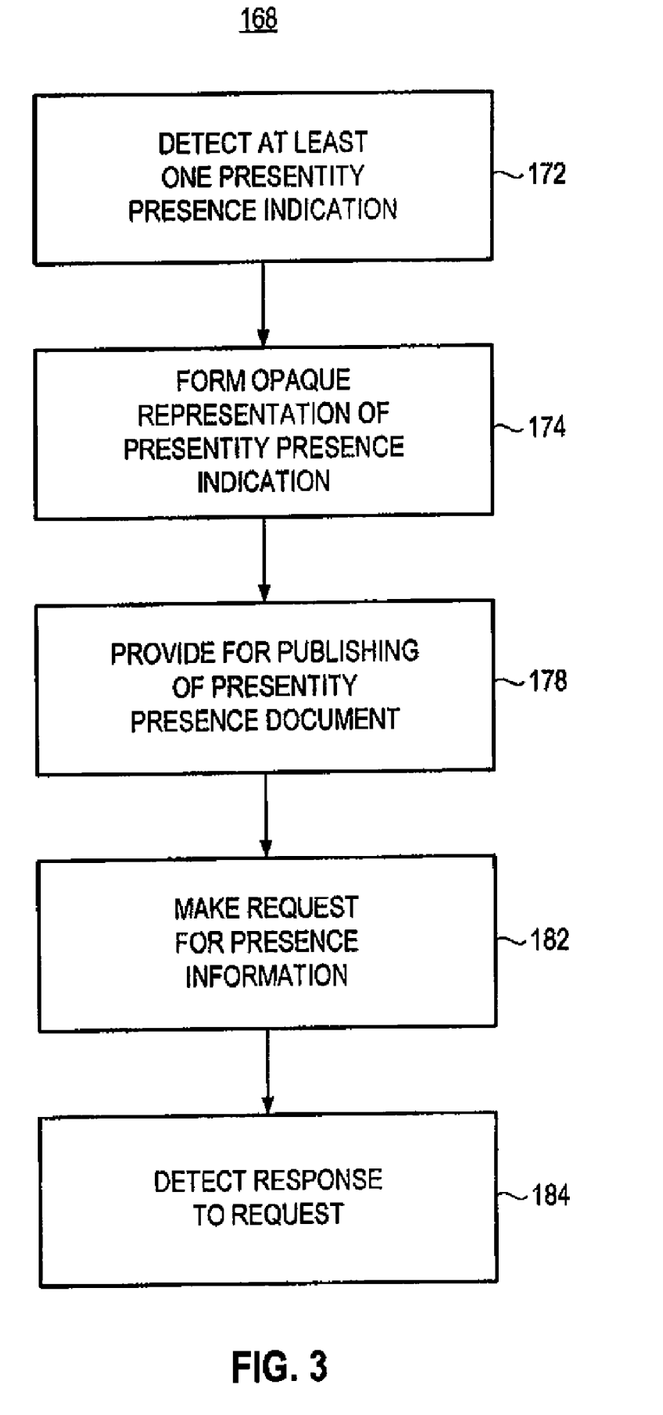
FIG. 3 illustrates a method flow diagram representative of the method of operation of an embodiment of the present disclosure.

FIG. 3 illustrates a method, shown generally at 168, representative of the method of operation of an embodiment of the present disclosure. The method facilitates use of presentity-provided presence information.

First, and as indicated by the block 172, at least one presentity presence indication is detected, either explicitly or inferred. Then, and as indicated by the block 174, an opaque representation of the presentity presence indication is formed. This formation is driven either directly by user (presentity) preference or through a policy mechanism (e.g. installed on the device by a service provider or an enterprise administrator).

Then, and as indicated by the block 178, publishing of a presentity presence document is provided. The document includes the opaque representation of the presentity presence indication. The method also includes publishing a policy or preference to be utilized by a presence server for later sharing/authorization on behalf of a watcher. The policy or preference can include actions and transformations for decoding/demarcating the presence document corresponding to presentity-X.

Subsequently, and as indicated by the block 182, a request is made for the presence information. And, as indicated by the block 184, a response to the request is detected.

The response, if affirmative, may be configured to include a de-opaquer to place the presence information in clear form. The response may also be configured to not include a de-opaquer. The later configuration will normally be associated with embodiments where the associated de-opaquer is otherwise available. This includes, but is not limited to, embodiments where an associated de-opaquer may have been previously supplied, included having been supplied by a method or path outside or different than that associated with the opaque material (i.e., provided on a memory card that was sent to the same machine via physical shipment, provided via a different electronic pathway such as an email, or any other means), where a de-opaquer may already be resident on the platform carrying out the process to make the information clear, where a de-opaquer may be requested after receiving the information having some or all opaque information, or other methods of retrieving and/or using a de-opaquer.

Thereby, a manner is provided by which to provide presence information of a presentity to a watcher while ensuring that the information is available only in accordance with the instructions of the presentity.

The previous descriptions are of preferred examples for implementing the disclosure, and the scope of the disclosure should not necessarily be limited by this description. The scope of the present disclosure is defined by the following claims.

What is claimed is:

1. A method for using presentity-provided presence information, said method comprising:
    detecting, by a processor of a communication device, at least one presentity presence indication including a first set of presentity presence information and a second set of presentity presence information;
    forming, by a presentity user agent being executed by the processor, an opaque representation of the first set of presentity presence information;
    forming, by the presentity user agent, a second representation of the second set of presentity presence information;
    combining, by the presentity user agent the opaque representation of the first set of presentity presence information with the second representation of the second set of presentity presence information into a modified presentity presence indication; and
    publishing the modified presentity presence indication of the combining operation to a presence server.

2. The method of claim 1 wherein said forming the opaque representation comprises hashing the first set of presentity presence information.

3. The method of claim 1 wherein said forming the opaque representation comprises encrypting the first set of presentity presence information.

4. The method of claim 3 wherein said encrypting comprises encrypting a plurality of portions of the first set of presentity presence information with a plurality of encryption keys, each portion forming an opaque representation portion containing watcher-targeted presence information.

5. The method of claim 3 wherein said encrypting is performed using a symmetric key.

6. The method of claim 3 wherein said encrypting is performed using an asymmetric key.

7. The method of claim 1 wherein said detecting comprises detecting a plurality of presentity presence indications and wherein said forming the opaque representation comprises forming an opaque representation of at least one of the plurality of the presentity presence indications.

8. The method of claim 7 wherein said forming the opaque representation comprises forming an opaque representation of fewer than all of the plurality of the presentity presence indications.

9. The method of claim 1 wherein publishing further comprises storing the modified presentity presence indication in a storage managed by the presentity user agent.

10. The method of claim 1 wherein publishing further comprises publishing a presentity presence/policy document that includes an encryption key.

11. The method of claim 1 wherein said forming the opaque representation occurs based on a time dependency.

12. The method of claim 1 wherein said forming the opaque representation is performed according to one of:
    a location dependency and a time/location dependency.

13. The method of claim 1 further comprising: providing a presence platform with a de-opaquer.

14. The method of claim 13 wherein the de-opaquer decrypts the presence information when a communication link is not trusted.

15. An apparatus for using presentity-provided presence information, said apparatus comprising:

a detector configured to detect at least one presentity presence indication including a file having a first set of presentity information and a second set of presentity information;

an indication opaquer configured to form an opaque representation of the first set of presentity presence information, and form a second representation of the second set of presentity presence information, such that a modified presentity presence indication is formed; and a publisher provider configured to publish the modified presentity presence indication formed by the indication opaquer.

16. The apparatus of claim 15 wherein said detector is configured to detect a plurality of presentity presence indications, and wherein said indication opaquer is configured to form an opaque representation of at least one of the presentity presence indications.

17. The apparatus of claim 15 wherein the publisher is further configured to provide a de-opaquer.

18. The apparatus of claim 17 wherein the de-opaquer decrypts the presence information when a communication link is not trusted.

19. An apparatus for facilitating use of presentity provided presence information, said apparatus comprising:
a requester configured to request presence information associated with a presentity;
a clear-information generator usable to generate clear information from opaque information;
a detector configured to detect a response to a request made by said requestor; and
a watcher configured to derive or compute presence indications based on a combination of opaque and non-opaque presence information.

20. The apparatus of claim 19 wherein the clear-information generator uses an encryption key capable of decrypting any encrypted received opaque information.

21. The apparatus of claim 19 wherein the clear-information generator uses a hash validator capable of validating any hashed received opaque information.

22. The apparatus of claim 19 further comprising a displayer configured to display the presence information.

23. The apparatus of claim 19 further configured to derive or compute presence indications based on non-presence related information.

24. The method of claim 1 wherein the second representation of the second set of presentity information comprises a clear set of presentity information, such that a watcher not having access to the first set of presentity information still has access to the second set of presentity information.

25. The method of claim 1 wherein the second representation of the second set of presentity information comprises a second opaque representation of the second set of presentity information, different than the opaque representation of the first set of presentity information, such that different watchers can access the first and second sets of presentity information differently.

26. The method of claim 25 wherein the second opaque representation is encrypted with a second key different than a first key used for the opaque representation, such that a first watcher can access the first set of presentity information using the first key, and such that a second watcher can access at least the second set of presentity information using the second key.

27. The apparatus of claim 15 wherein the second representation of the second set of presentity information comprises a clear set of presentity information, such that a watcher not having access to the first set of presentity information still has access to the second set of presentity information.

28. The apparatus of claim 15 wherein the second representation of the second set of presentity information comprises a second opaque representation of the second set of presentity information, different than the opaque representation of the first set of presentity information, such that different watchers can access the first and second sets of presentity information differently.

29. The apparatus of claim 28 wherein the second opaque representation is encrypted with a second key different than a first key used for the opaque representation, such that a first watcher can access the first set of presentity information using the first key, and such that a second watcher can access at least the second set of presentity information using the second key.

* * * * *